Figure 1:
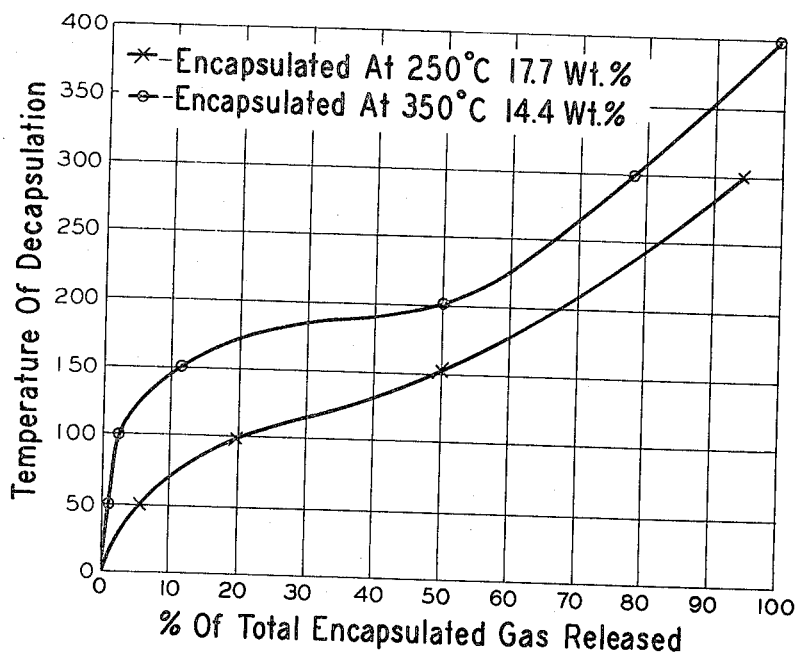

INVENTORS
Lloyd H. Shaffer
Walter J. Sesny

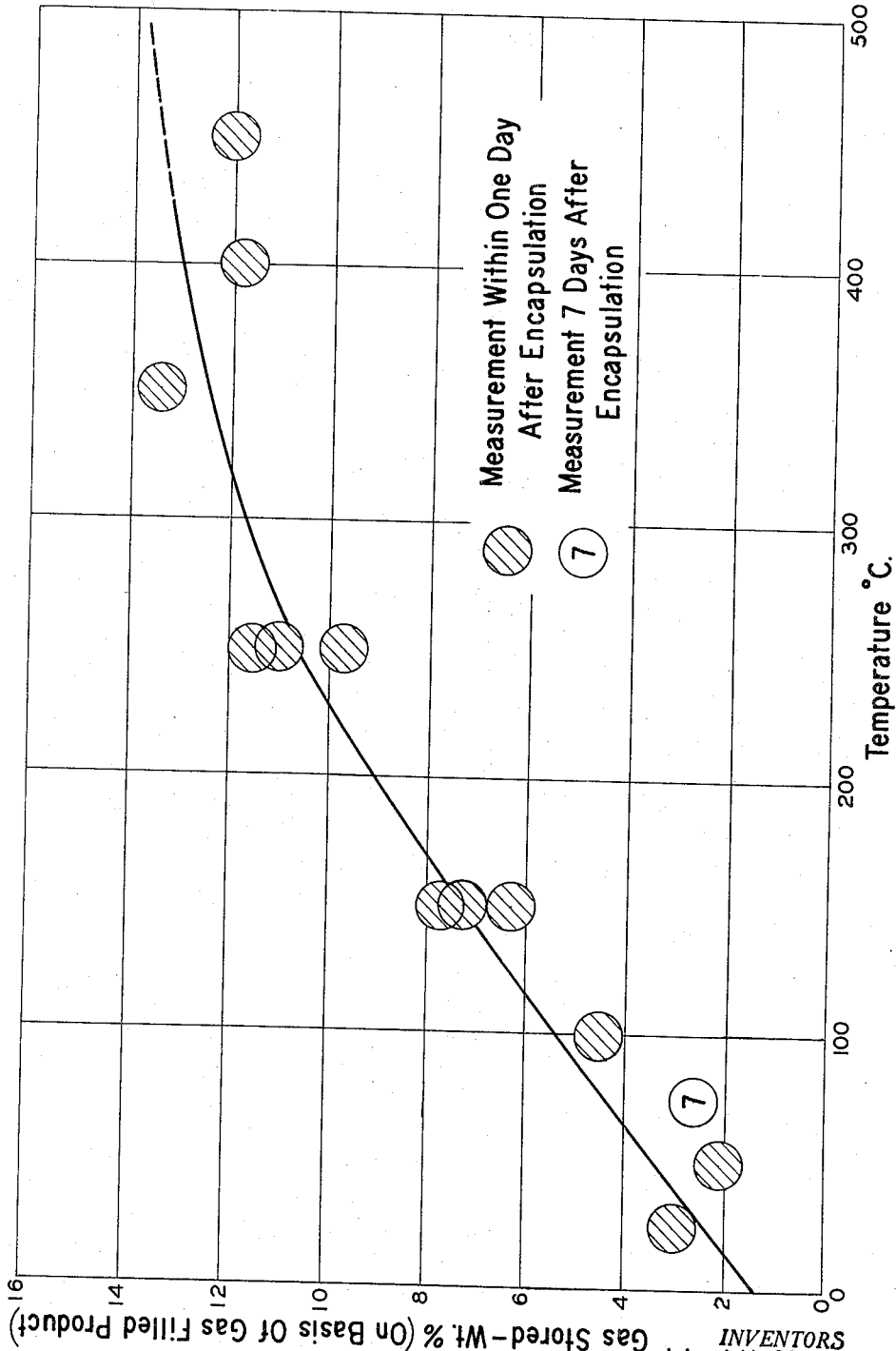

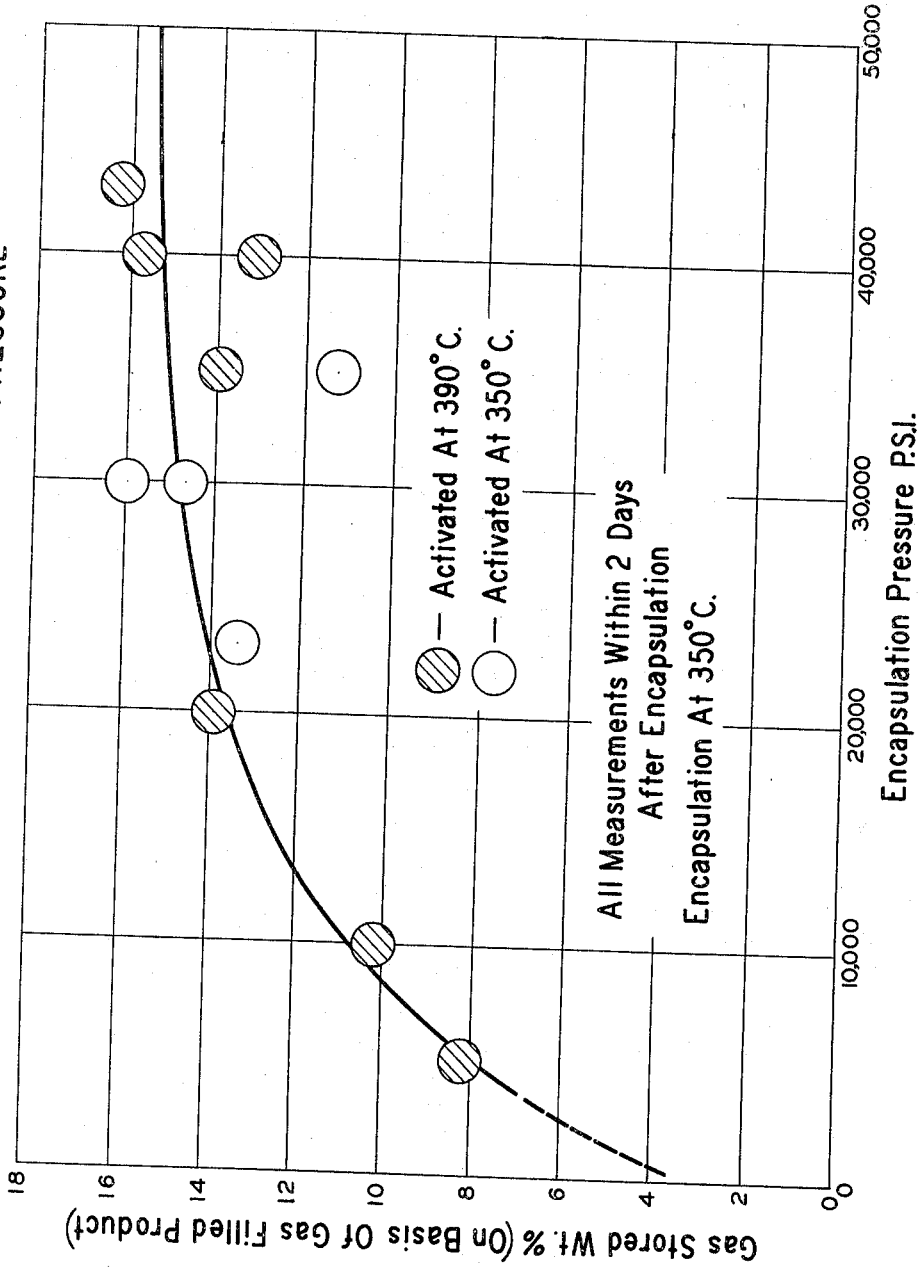

United States Patent Office 3,316,691
Patented May 2, 1967

3,316,691
FLUID ENCAPSULATION PRODUCT
Walter J. Sesny, Hammond, Ind., and Lloyd H. Shaffer, Springdale, Conn., assignors to Union Carbide Corporation, a corporation of New York
Continuation of application Ser. No. 156,735, Dec. 4, 1961. This application May 31, 1966, Ser. No. 554,211
2 Claims. (Cl. 55—66)

This application is a continuation of our prior copending application Ser. No. 156,735, filed Dec. 4, 1961, and now abandoned.

The present invention relates to storage of fluids by encapsulation. More particularly, the invention relates to a zeolitic molecular cage containing trapped fluid molecules at pressure substantially in excess of the vapor pressure of the fluid in the surrounding environment and a process for producing such product. The present invention also relates to methods of releasing the encapsulated fluid.

For the purpose of the present invention the term "fluids" is defined to mean a liquid or a gaseous compound or substance. Where substances are discussed as being in the gaseous state the term "gaseous" will be used and when the substances under discussion are liquid the term "liquid" will be employed.

There are several known mechanisms capable of causing fluid occlusion in porous solid media. They may conveniently be classified as adsorption mechanisms, activated adsorption mechanisms and clathration mechanisms.

Adsorption is a phenomenon whereby fluids are held on the surface of solid media in thermodynamic equilibrium with the surrounding atmosphere. True adsorption is a reversible process. The capacity of a given solid media to hold a fluid by adsorption is a function of the surface area of the solid media, the temperature and pressure of the environment in which adsorption is taking place and the vapor pressure of the fluid.

Activated adsorption, commonly called chemisorption, is a phenomenon whereby fluids are strongly held on the surface of solid media. In this phenomenon the higher stability or retention of the fluid on the adsorbate is sometimes attributed to quasi-chemical bonding and this process is not completely reversible. In general the capacity of chemisorption adsorbents is higher than simple adsorption adsorbents.

Clathration is a mechanism whereby gas molecules are adsorbed by a melted host material and upon solidification of the melted host material the gas molecules are incorporated into the crystal lattice of the host.

Several disadvantages are encountered in utilizing the afore-mentioned adsorption mechanisms. The capacity and stability characteristics of adsorption and to a large extent activated adsorption phenomenon are dependent upon the prevailing temperature, vapor pressure and concentration of the adsorbate in the surrounding atmosphere; e.g. the amount and extent of retention of the adsorbate held by the adsorbent is dependent upon the temperature and pressure on the adsorbate-adsorbent system and the concentration and vapor pressure of the adsorbate in the surrounding atmosphere in contact with the adsorbent. In clathration compounds the occluded gas becomes an integral and required constituent in the crystal lattice of the clathration compound. The extent of occlusion of the gas species is invariant and dependent upon the host substance.

It is an object of the present invention to provide a novel fluid encapsulation product.

It is another object to provide a fluid encapsulation product which has a high storage capacity.

It is a further object to provide a fluid encapsulation product which has much higher gas retention over widely varying temperature and pressure than can be achieved by adsorption or chemisorption.

It is a still further object to provide a fluid encapsulate in which the capacity for occluded fluid can be readily varied in a given encapsulation product to a much greater extent than can be accomplished in occlusion by clathration mechanisms.

The product satisfying the above-mentioned objects comprises a substantially dehydrated zeolite containing encapsulated fluid molecules. The fluid molecules are incapable of passing through the pores of the dehydrated zeolite in substantial amounts at temperatures ranging from ambient temperature up to the encapsulation temperature; that is, leakage from the cage at temperatures below encapsulation temperature is very low.

The zeolites contemplated as amenable for use in the present invention are produced from natural and synthetic substantially hydrous three-dimensional crystalline metal aluminosilicates fabricated by the union of $SiO_4$ and $AlO_4$ tetrahedra and cationic constituents in such an arrangement that the ratio of aluminum and silicon atoms to oxygen is approximately two, e.g. $O/(Al+Si) \sim 2$. The electrovalence of the tetrahedra containing aluminum is balanced by the inclusion in the unit cell of one or more cationic constituents (e.g. M) so as to form a three dimensional crystalline structure containing cavities. The cavities communicate with surrounding three dimensional crystalline structures in the gross crystalline structure or with the surrounding environment through pores of a dimensional characteristic of each particular species of three dimensional crystalline aluminosilicate. The cavities in the crystal structure initially are occupied by water molecules. Before use in the present invention, the unit cells are dehydrated or activated to remove the water of crystallization thereby substantially freeing the cavities for subsequent acceptance and storage of fluid molecules.

The aforementioned three-dimensional crystalline metal alumino-silicates utilized in the present invention may be referred to as zeolites and the zeolitic molecular cages utilized in the present invention and produced by dehydration or activation of the aforementioned zeolites may be called zeolitic molecular sieves. Though this terminology may be used, it is to be understood that the terms zeolitic molecular sieve, zeolites and zeolitic molecular cages may be used interchangeably to indicate a three-dimensional, crystalline metal alumino-silicate structure. Only those zeolitic molecular cages which retain their three-dimensional crystalline structures after exposure to elevated temperatures as high as a temperature hereinafter defined as the encapsulation temperature are amenable for use in the present invention. The temperatures at which the hereinbefore defined zeolites and zeolitic molecular cages or sieves remain crystalline are well known in the art.

Synthetic three-dimensional crystalline alumino-silicates amenable for use as the molecular cage in the present invention after activation or dehydration include those described in great detail in the following U.S. patents and copending U.S. patent applications.

Zeolite K–G disclosed in application Ser. No. 568,653 filed Feb. 29, 1956, now U.S. 3,056,654; Zeolite W disclosed in application Ser. No. 680,382 filed Aug. 26, 1957, now U.S. 3,012,853; Zeolite R disclosed in application Ser. No. 680,381 filed Aug. 26, 1957, now U.S. 3,030,181; Zeolite D disclosed in application Ser. No. 680,383 filed Aug. 26, 1957, and now abandoned; Zeolite F disclosed in U.S. Patent No. 2,996,358; Zeolite J disclosed in application Ser. No. 684,843 filed Sept. 19, 1957, now U.S. 3,011,869; Zeolite M disclosed in U.S. Patent No. 2,995,423; Zeolite H disclosed in patent application Ser. No. 700,736 filed Dec. 5, 1957, now U.S. 3,010,789; Zeolite Q disclosed in U.S. Patent No. 2,991,151; Zeolite S disclosed in application Ser. No. 724,843 filed Mar. 31, 1958, now U.S. 3,054,657; Zeolite B disclosed in application Ser. No. 827,680 filed July 17, 1959, now U.S. 3,008,803; Zeolite Z disclosed in U.S. Patent No. 2,972,516; Zeolite E disclosed U.S. Patent No. 2,962,355; Zeolite T disclosed in U.S. Patent No. 2,950,952; Zeolite A disclosed in U.S. Patent No. 2,882,243; Zeolite X disclosed in U.S. Patent No. 2,882,244; Zeolite Y disclosed in patent application Ser. No. 109,487, now U.S. Patent No. 3,130,007; and Zeolite L disclosed in application Ser. No. 122,398 filed July 7, 1961, and now abandoned.

The present invention also contemplates the use of natural zeolitic molecular cages including chabazite, mordenite, analcite, gmelinite, erionite and faujasite.

It is to be understood that the aforementioned natural and synthetic zeolites are amenable for use in the present process in any of the partially or fully cation-exchanged forms.

Dehydration or activation of the zeolites to sufficient extent to render them amenable for use in the present process and products is readily performed by heating the crystals in a flow of dry gas to a temperature generally ranging from about 100° C. to 550° C. dependent upon the species of zeolite being treated.

The term "capsulate" is used in the present disclosure and appended claims to describe the phenomenon whereby the fluid species are held within the cavities of the molecular cage in a state wherein they do not possess sufficient energy to overcome the potential energy barrier posed by the pore openings in the molecular cage and therefor cannot pass through the pore opening. The phenomenon of encapsulation therefore is distinguished from occlusion of gases in solid media by adsorption phenomenon whereby the gases are in equilibrium with the gases of the same species in the surrounding atmosphere, chemisorption wherein the gases are held on a solid media by quasi-chemical bonds and clathration wherein the gases are actually held in the clathrate compound as an essential constituent of their crystal structure. The variations of the root word capsulate prefixed by "en" such as "encapsulation" and "encapsulate" are used to describe the process of filling the molecular cage with the fluid. The term capsualte prefixed by "de" such as "decapsulation" and "decapsulate" are used to describe the process of removing the fluid from the cage.

As previously mentioned the molecular cages of the present invention contain uniform pores of various "dimensions," each pore dimension being characteristic of a particular species of zeolitic molecular cage.

It is also known that various species of zeolites may have more than one pore-cavity system. These pore-cavity systems are distinguishable on the basis of their pore size and the volume of the cavities. For example, in Zeolite X the alumino silicate polyhedra are arranged in such a manner as to form at least two distinctly different pore-cavity systems; one system having a characteristically large pore size and large area cavity and another system having a small pore size and cavity area.

*Pore "dimension" of the molecular cage and gas molecule "dimensions" as a function of temperature*

The term "pore dimension" up to this point has been loosely used to refer to the size openings in the three-dimensional crystals which communicate with the surrounding crystals in the gross crystal structure and the environment surrounding the molecular cage. For the purposes of the present invention pore "dimensions" must be defined in more detail. By the same token the "dimension" of gas molecules must also be described in more detail.

The pore dimensions are temperature dependent. At lower temperatures when the atoms of the crystal are at relatively low thermal energy states they are in a quiescent or damped state and the pore dimension approaches the effective pore diameter; e.g. the pore diameter at about room temperature resulting from calculations based on lattice constants, atomic sizes and etc. As temperature increases the atoms become excited by adsorption of thermal energy causing pulsation or vibration about the crystal lattice position that they occupy at low temperatures. Increasing temperature causes the atoms in the crystals to transform from a relatively quiescent state to an excited state of pulsation. With increasing temperature, there is a concommittent apparent increase in the pore dimension as evidenced by the fact that the pores are capable of admitting "larger" molecules at elevated temperatures than at lower temperatures. The term "excited pore size" is used herein to denote the pore size at temperatures above absolute zero and up to the temperature at which the pore cavity structure of the crystal is destroyed.

Although the shape of the pores in the crystals are generally described as circular there may be some distortion of the pore shape at elevated temperatures; that is, the pore may become somewhat ellipsoidal in shape. Also in many species of crystals the cationic constituents defined above as M occupy positions in the crystal lattice in such a manner as to partially block the pore passage.

By the same token the fluid molecules are subject to a similar phenomenon. That is the apparent size of the fluid molecules increases with increasing temperature in a manner similar to the pore size of the crystals referred to herein. The term "excited minimum molecular cross section" is used herein to denote the size of the molecules at their minimum molecular cross section at a given temperature.

Gas molecules possess various shapes ranging from the essentially spherical shape of monatomic inert gas through the shapes of diatomic gas molecules such as hydrogen, oxygen, nitrogen etc., to the shapes of organic gas molecules. The latter vary widely in their structural shapes; for example, the straight, chain hydrocarbons such as pentane generally have cylindrical shapes while the branch chain hydrocarbons such as 2,2-dimethylpropane have spherical shapes. In addition the gas molecules do not possess constant electrical charge symmetry at all points on their periphery but rather exhibit dipole characteristics or polarization. Also, unsaturated hydrocarbons possess additional complex polarization.

It is readily apparent therefore that the ability of a pore of a given species of molecular cage to admit a given species of fluid molecule is a complex function of the excited size of the pores of the molecular cage at a given temperature, and the excited minimum molecular cross section of the fluid molecule at a given temperature coupled with the shape, polarity and the type of bonding of the gas molecule and the position occupied by the cationic constituent in the crystal lattice of the molecular cage itself.

Since the phenomenon of encapsulation and decapsulation is such a complex function of the aforementioned variables, it is probably more conducive to a clear understanding of the present prenomenon if encapsulation and decapsulation are also discoussed and defined from the standpoint of the energy possessed by the fluid molecule in relation to the potential energy barrier presented to the gas molecule by the pores in the molecular cages.

As the thermal energy intensity of the fluid-cage system is increased, e.g. the temperature of the system is increased, the fluid molecules absorb thermal energy which manifests itself as increased energy of translation and vibration. As temperature increases the fluid molecules see less and less energy difference between their energy state and the potential energy barrier at the pore opening. Eventually with further temperature increases the fluid molecules pass to higher energy states and at some increased temperature see no energy barrier at the pore opening. At this point the fluid molecules are capable of passing through the pore opening and thereby entering the cavity of the molecular cage.

When the fluid molecule no longer sees a potential energy barrier barring its passage into the molecular cage one could say that the excited pore size of the molecular cage now exceeds the excited minimum molecular cross section of the fluid molecule and the passage through the pore by the fluid molecule is relatively uninhibited.

The term fluid is defined and used herein in referring to the substance or compound being encapsulated for a definite purpose. It is not known, but many theories have been advanced, as to whether or not a compound exists in gaseous or liquid state within the cavities of a substantially or fully dehydrated zeolite. Accordingly the term fluid will be used to characterize the compound encapsulated within the cavity. In addition at the temperature and pressure of encapsulation it is apparently possible that the compound to be encapsulated may be either a gas or a liquid immediately prior to and upon passage through the pore of the cage, therefore, the term fluid is considered a desirable word to use in referring at this point to the compound being encapsulated.

In general it is thought that the molecular species of fluids having effective sizes less than about 6 A. are completely in the gaseous state at low temperature or if not completely in the gaseous state, they have very high vapor pressures. When these substances are utilized in the present invention they most probably are in the gaseous state when encapsulated and decapsulated but again when in residence within the cavities they may be in gaseous or liquid state and accordingly are referred to as fluids. By way of illustration, there is no evidence that such monoatomic and diatomic gases as the inert gases, the halogens and oxygen exist in any state other than the gaseous state when outside the molecular cage at any temperature and even at high pressures.

By the same token fluids having effective sizes greater than about 6 A. may exist predominantly as liquids at low temperature and pressure but they are capable of vaporization at low temperature and pressure. At the elevated temperature and pressure of encapsulation they may be in the gaseous state.

In any event the fluid species are encapsulated within the cavities of the molecular cages without substantial leakage at temperatures and pressures below encapsulation temperature and encapsulation pressure and in addition are not in thermodynamic equilibrium with the same fluid species in the atmosphere surrounding the molecular cage. That is the concentration of fluids species within the molecular cage is independent of the vapor pressure of the fluid species in the surrounding environment. The fluid encapsulated species are not in thermodynamic equilibrium with the same fluid species in the surrounding atmosphere.

The fluid species amenable for use in the present process and product are those species of fluids which are substantially gaseous at standard temperature and pressure or have at least a substantial vapor pressure at standard temperature and pressure. As previously noted, the molecules having effective diameters less than about 6 A. are gaseous at standard pressure and temperature and all these gases can therefor be utilized in the present process. Of the substances having molecules having effective sizes greater than about 6 A., the present invention contemplates the use of those substances which have a detectable vapor pressure at standard pressure and preferably those substances which have a substantial vapor pressure at standard pressure and temperature.

*Encapsulation of fluid molecules*

A process for producing the present novel product comprises contacting three dimensional crystalline substantially dehydrated zeolites with fluid molecules, at elevated temperature to impart sufficient energy to the fluid molecules to enable them to surmount the potential energy barrier posed by the pores of the molecular cage and submitting the system to elevated pressure. In this manner the fluid molecules are caused to pass into the cavity of the molecular cage and to accumulate in large number per unit volume. The temperature is then decreased at least to a level at which there is a substantial difference between the energy level of the fluid molecules and the potential energy barrier posed by the pores in the molecular cage i.e. the latter being at a higher potential energy level at the lower temperature. At the lower temperature the fluid molecules cannot pass through the pore openings and are encapsulated within the cavity of the molecular cage in high concentrations. The pressure on the admixture is then decreased and the resulting product is an encapsulation compound wherein the fluid molecules are effectively held within the cavity of the molecular cage at a concentration per unit volume much in excess of the vapor pressure of the same fluid in the surrounding environment. Encapsulation is effected by the inability of the fluid molecules to pass through the pore openings at lower temperatures because they are unable to surmount the potential energy barrier posed by the pore.

In the present process, pressurization of the cage-fluid system may be conducted before, during and/or after the temperature is increased to a level whereby the fluid molecules pass into the cavity of the molecular cage. A most important consideration in the process of encapsulation is the point at which the pressure on the system is decreased. If a maximum concentration of fluid is to be encapsulated, the pressure on the system must be maintained until the temperature of the system is lowered to a level at which the fluid molecule cannot pass through the pore of the molecular cage.

The phrase "encapsulation temperature" is used herein to denote temperatures at which the fluid molecules possess sufficient energy to pass through the pore and into the cavity of the molecular cage. The phrase "encapsulation pressure" is used herein to denote the pressure at which the fluid-cage mixture is under at the encapsulation temperature. In general it has been found that encapsulation temperatures ranging from 150° C. to about 450° C. and encapsulation pressures above about 5,000 p.s.i. are required to obtain substantial amounts of encapsulated fluids in the encapsulation compound. In addition it has been found that the use of pressures above about 60,000 p.s.i. apparently does not cause substantial increase in the amount of fluid encapsulated in the final product. Encapsulation temperature and pressure are discussed in more detail hereinafter.

It is interesting at this point to note that about 100 cc./g. of gases such as methane or argon can be stored in the present product. The amounts of gas stored per unit weight of encapsulating agent are comparable to the amounts that are handled in standard cylinders. For example, an average "T" cylinder of argon at 2,640 p.s.i. holds about 19.6 wt. percent of gas; up to 19.3 wt. percent of argon has been encapsulated in Potassium A zeolite.

*Decapsulation of fluid molecules*

Decapsulation may be performed by heating the encapsulation products to temperatures above the encapsulation temperature while maintaining the pressure on the product at some level below the encapsulation pressure. If relatively complete decapsulation is required it is preferably accomplished by heating to encapsulation temperature while maintaining the pressure at substantially less than the encapsulation pressure and as low as atmospheric pressure or lower.

Although the above preferred thermal method of decapsulation leads to recovery of virtually all the encapsulated constituent, it has also been found that it is possible to recover predetermined fractions of the encapsulated gas by heating the encapsulates to predetermined temperatures below the encapsulation temperatures. In this manner the fluid may be controllably released as desired.

FIGURE 1 presents in graphical form the results of controlled release of argon from a type A zeolitic molecular cage. The encapsulates in FIGURE 1 were prepared by heating a type A zeolitic molecular cage having a K/Na ratio of 61/39 in contact with argon to (1) encapsulation temperatures of 250° C. at a pressure of 40,000 p.s.i. to form an encapsulate containing 17.7 weight percent argon and (2) an encapsulation temperature of 350° C. at a pressure of 27,000 p.s.i. to form an encapsulate containing 14.4 weight percent argon. As shown by FIGURE 1, the amount of gas released can be effectively controlled by selecting a proper decapsulation temperature. The pressure utilized at decapsulation temperature in securing the data shown in FIGURE 1 was approximately atmospheric.

Referring to FIGURE 1, it can be seen that in the case of argon encapsulated at 350° C. a temperature of about 200° C. resulted in release of 50 percent of the encapsulated argon whereas in the case of gas encapsulated at 250° C., a temperature of only about 150° C. resulted in the release of 50 percent of the encapsulated argon. Accordingly in thermal decapsulation, the temperature of encapsulation is a factor to be considered in arriving at the decapsulation temperature utilized to cause a predetermined amount of fluid decapsulation. As shown by the FIGURE 1, the extent of release of argon increases with increasing temperature for gas encapsulated at a given encapsulation temperature and pressure. The following Table I shows the extent of recovery of nitrogen, carbon monoxide and argon from various types of zeolitic molecular cages at a decapsulation temperature of 150° C. and a decapsulation pressure of approximately atmospheric pressure.

temperature at which the initial water of crystallization is removed from the crystalline aluminosilicates prior to their use in the present process and the type of cationic constituent present in the cage in conjunction with the position in the cage which the cationic constituent occupies.

*Effect on storage capacity and storage stability of various cationic constituents in the dehydrated zeolites*

As is well known the pore size of zeolitic molecular sieves is found to vary widely.

In addition it has been found that ion exchange of the cationic constituents in various zeolitic molecular sieves will result in a change in the lattice constants and effective pore size of the sieves. For example in the sodium A sieves, 12 sodium ions are associated with each cavity. Four of them take the position in or near the pores and partially block the pores. The effective pore size at room temperature of sodium A sieves is about 3.9 A. If sodium ions are ion exchanged for calcium ions the effective pore size will increase to as high as about 4.2 A. If sodium ions are exchanged for potassium ions the effective pore size decreases to about 3.0 A. Therefore partial cation exchange of sodium for calcium potassium in the sieve crystal will vary the effective pore size from about 3 A. up to as high as 4.2 A. From an energy standpoint, the potential energy barrier posed by a given zeolitic molecular sieve to a given fluid molecule could be described as generally increasing with potassium ion exchange of sodium ions and generally decreasing with calcium ion exchange for sodium.

It has been found that the stability of a given encapsulate is increased as the potential energy barrier exhibited by the pore to a given fluid molecule is in-

TABLE I

| Molecular | | Cation Ratio | Gas | Encapsulation | | Initial Gas Content | | Gas Content After Decapsulation | |
|---|---|---|---|---|---|---|---|---|---|
| Cage | Cation | | | Temp., ° C. | Press., p.s.i. | Weight (percent) | Cc./g. | Cc./g. | Percent of Total Removed |
| A | K/Na | 40/60 | N₂ | 350 | 40,000 | 12.1 | 106.0 | 30.0 | 63.5 |
| A | Ca | 100 | CO₂ | 350 | 40,000 | 5.5 | 30.4 | 31.2 | 80.5 |

The time period over which decapsulation can be conducted is also temperature and pressure dependent; therefore, selection of a proper temperature and pressure of decapsulation will enable an artisan to decapsulate a predetermined amount of gas in a predetermined time interval.

Decapsulation may also be conducted by exposing the encapsulate to water. As is well known the crystalline aluminosilicates of the present invention have a very strong tendency to absorb water molecules in their cavities through their pores. It has been found that the tendency of the molecular cages to absorb water is so strong that the water molecules will displace the fluid molecules in the cavity by forcing them out through the pore openings thereby causing decapsulation.

In addition destruction of the molecular cage itself may be utilized as a method of decapsulation. This may be accomplished by heating to temperatures above the stability of the zeolitic molecular cage, or the cage may be decomposed with a mineral acid.

In addition any combination of the above-mentioned decapsulation methods may be utilized.

There are several important process parameters which have a pronounced effect on the amount of fluid encapsulated in the molecular cage and/or the ability to retain encapsulated fluid in the molecular cage over extended periods of time and over varying temperature ranges. The parameters include the pressure at which encapsulation is conducted, the temperature of encapsulation, the creased e.g. the effective pore size is decreased. The capacity of a particular sieve for a given fluid is found to decrease as the potential energy barrier of the pore, or effective pore size, as viewed by the fluid molecules is decreased.

A more detailed discussion is now presented in relation to the effect of varying cation ratios in sodium A zeolitic molecular sieve in the encapsulation of methane, argon, nitrogen, oxygen, chlorine, ethylene and krypton. The investigations were carried out by heating, under pressure, sodium type A zeolitic molecular sieves in contact with the gas to be encapsulated. After encapsulation several measurements of storage capacity were made over a varying period of time ranging from several days to several weeks.

Figure 2:
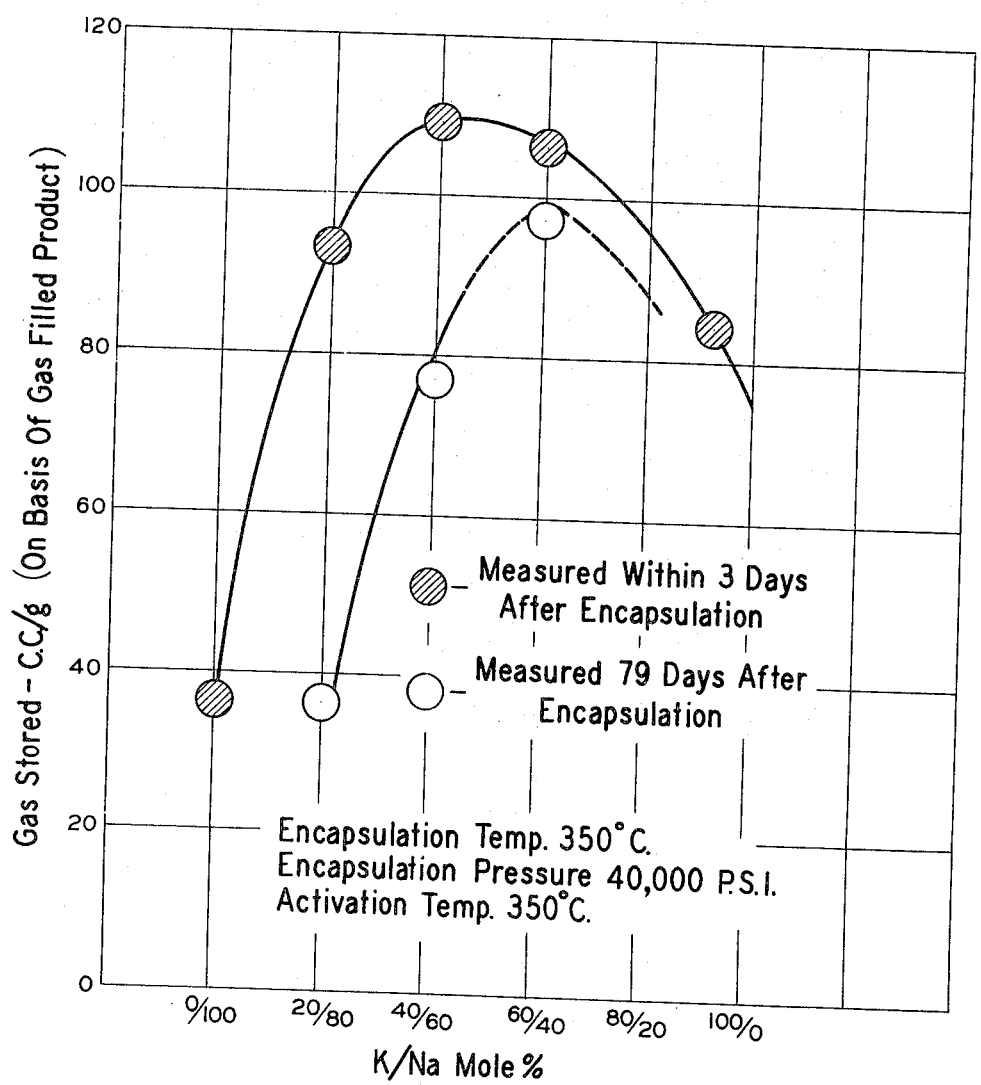

FIGURE 2 illustrates both storage capacity and storage stability of argon encapsulated in dehydrated sodium A zeolites over varying ratios of sodium and potassium cationic constituents.

It is readily apparent from the graphical presentation in FIGURE 2 that the greatest initial storage occurs for K/Na ratios near about 40/60 but the greatest storage stability is experienced by K/Na ratios near 60/40. Only a 9 percent loss in argon was experienced with K/Na ratios of about 60/40 after 79 days of encapsulation. Argon is a molecule of relatively larger effective molecular cross section.

Figure 3:
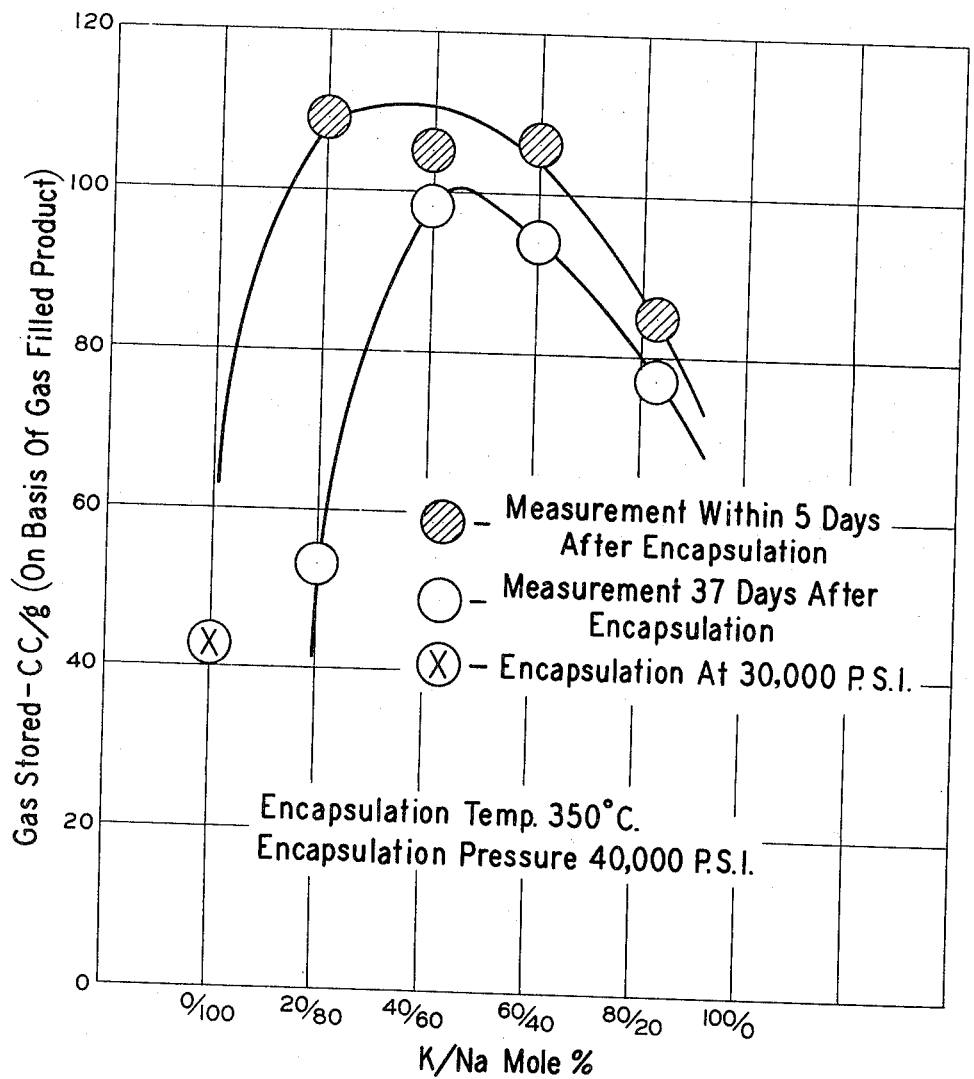
Figure 4:
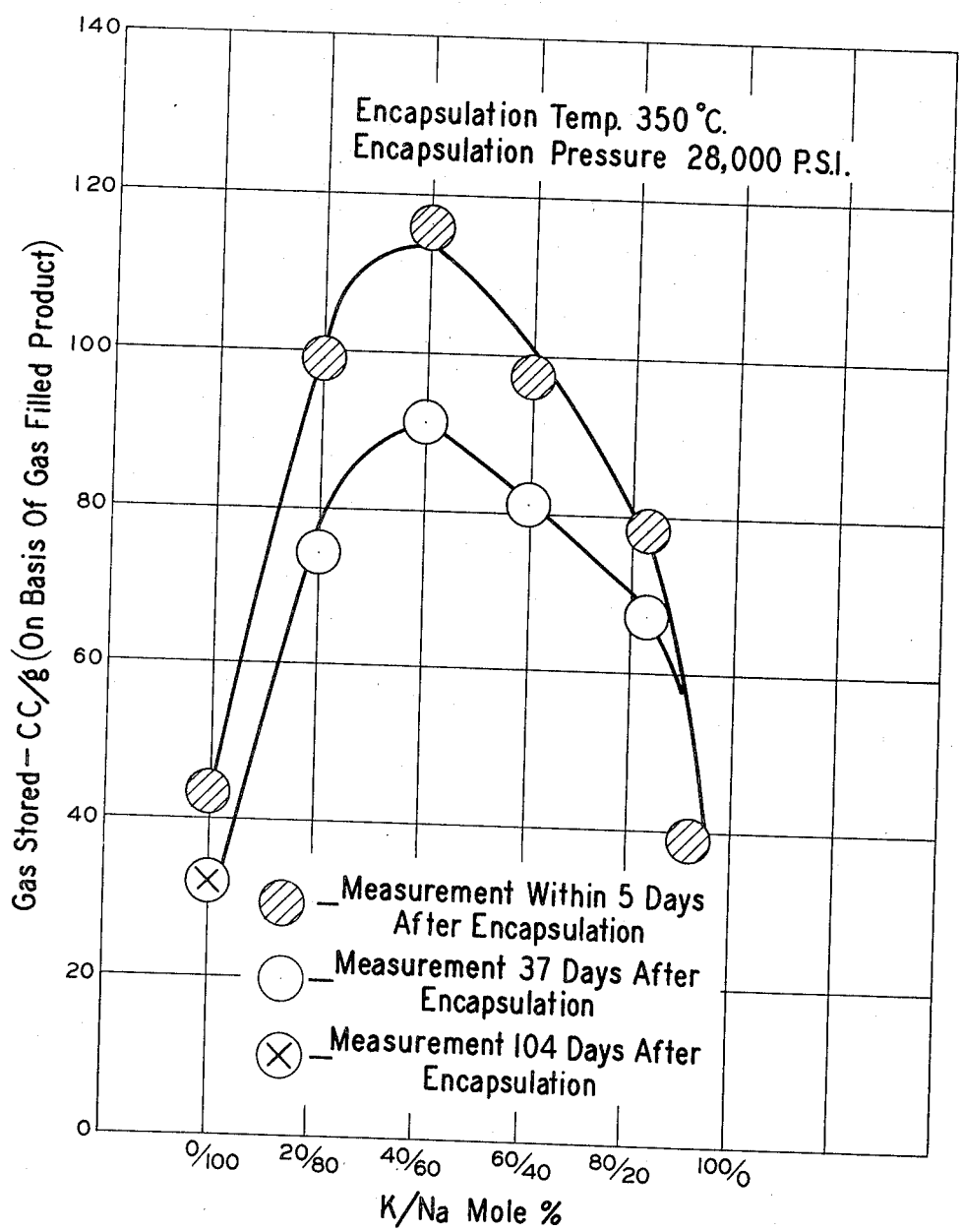

FIGURES 3 and 4 illustrate both storage capacity and storage stability of methane over varying ratios of sodium and potassium cationic constituents encapsulated in dehydrated sodium type A zeolites. Methane is a molecule of relatively large effective molecular cross section. The graphical presentations in FIGURES 3 and 4 indicate that the greatest initial storage capacity is experienced for K/Na ratios near 40/60 similar to that experienced with argon but the greatest storage stability is obtained at the K/Na ratios in excess of 60/40. Storage stability appears to increase with increasing ratios of K/Na above 60/40 in the methane-sodium A zeolite encapsulate.

Figure 5:
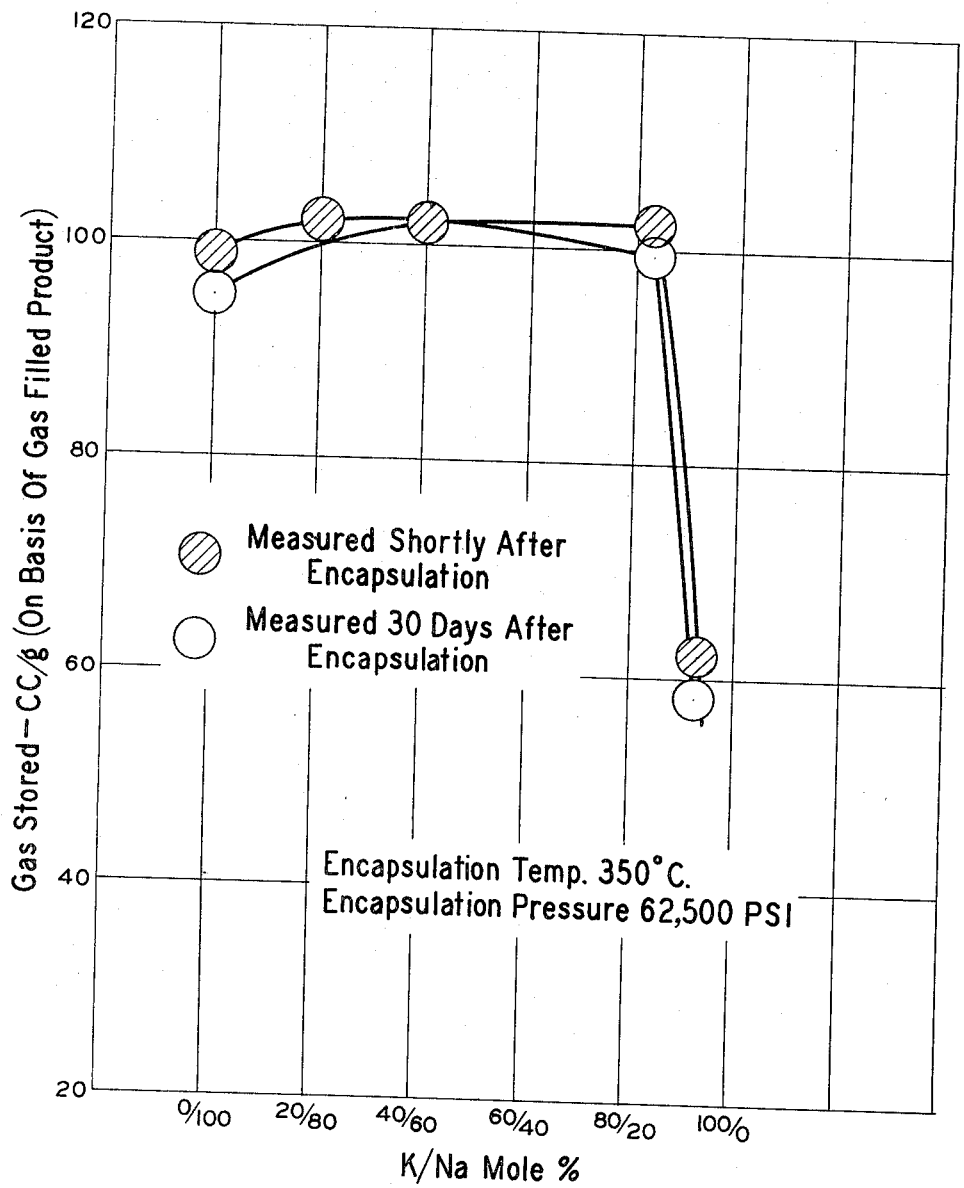

FIGURE 5 illustrates both storage capacity and storage stability of krypton in dehydrated sodium A zeolites. Krypton molecules are slightly larger than argon molecules as far as effective molecular cross section is concerned.

FIGURE 5 indicates that storage capacity is very high over the whole range of K/Na ratios up to about 80/20. Storage stability is high over approximately the same range with no apparent loss of encapsulated krypton at a K/Na ratio of about 40/60 after a one month storage period.

The following Table II presents additional capacity data secured on various encapsulates.

small pore-cavity system makes up approximately 10 or 15 percent of the total cavity volume of Zeolite X and the pore size in this system is sufficiently small to enable one to encapsulate argon and/or oxygen in the small pore-cavity system of Zeolite X. This phenomenon is not limited to Zeolite X but is operable in many other zeolites especially the species of zeolites having larger pores.

Effect of activation temperature on storage capacity

The activation temperature at which the water loaded three dimensional zeolites are treated prior to use in the present process has a marked effect on storage capacity of the dehydrated zeolitic molecular cage. This is thought to be due to residual water molecules remaining in the zeolite, particularly in close association with the cationic constituents in the cage.

Figure 6:
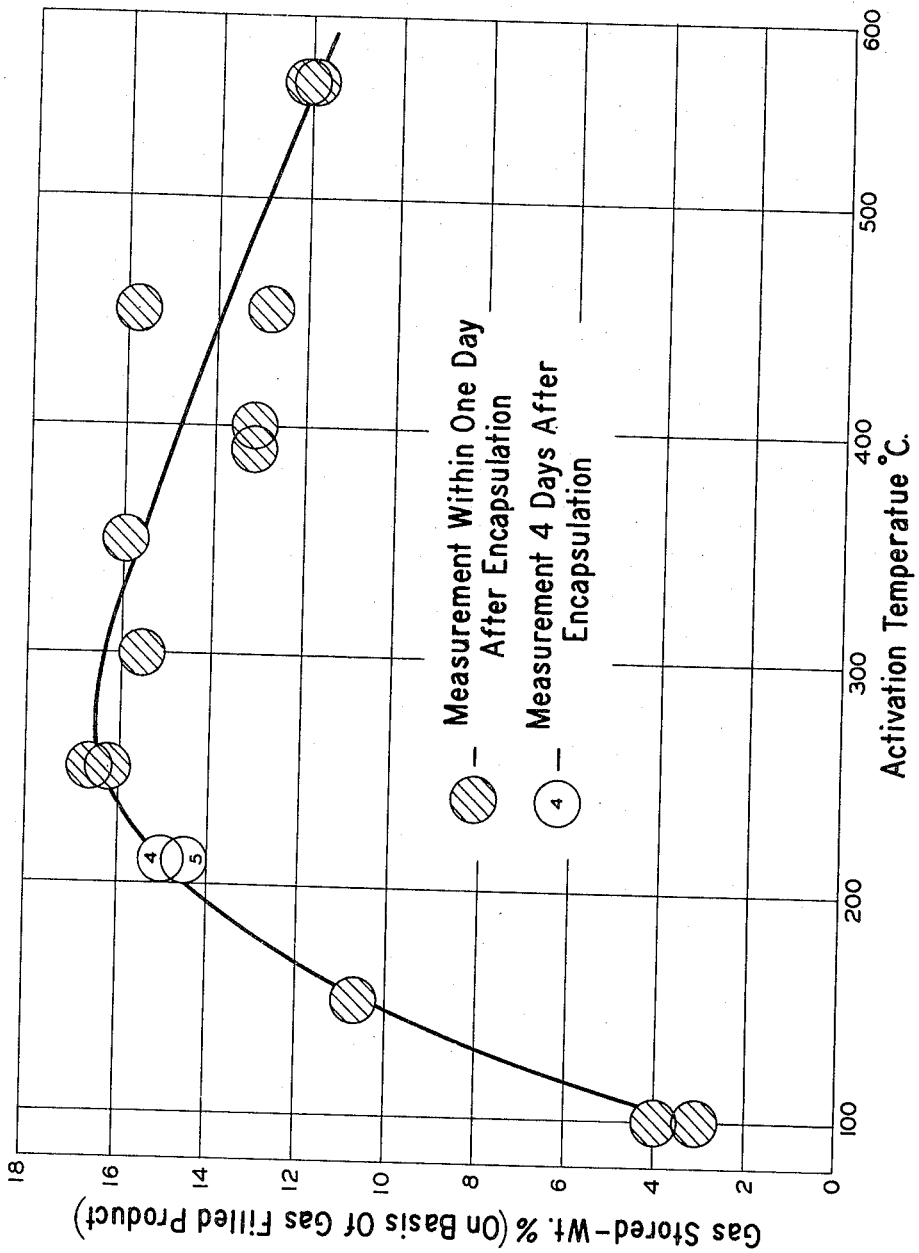

FIGURE 6 is a plot of initial gas storage capacity as a function of the temperature of activation for argon in dehydrated type A zeolite which contained substantially only potassium as the cationic constituent. FIGURE 6 indicates that for this system a capacity of greater than about 10 weight per cent argon is readily achieved when activation temperatures above about 150° C. are em-

TABLE II

| No. | Starting Materials | | Ratio | Gas | Encapsulation | | Storage Capacity, cc. gas/gm. encapsulate |
|---|---|---|---|---|---|---|---|
| | Zeolitic Molecular Cage | Cation | | | Temp., °C. | Press., p.s.i.g. | |
| 1 | A | K/Na | 92/8 | $N_2$ | 350 | 30–40M | 61.0 |
| 2 | A | K/Na | 83/17 | $N_2$ | 350 | 30–40M | 67.6 |
| 3 | A | K/Na | 60/40 | $N_2$ | 350 | 30–40M | 98.4 |
| 4 | A | K/Na | 40/60 | $N_2$ | 350 | 30–40M | 106.0 |
| 5 | A | K/Na | 35/65 | $N_2$ | 350 | 30–40M | 103.2 |
| 6 | A | K/Na | 20/80 | $N_2$ | 350 | 30–40M | 91.2 |
| 7 | A | Li/Na/K | 44.7/6.4/48.9 | $N_2$ | 350 | 30–40M | 52.0 |
| 8 | A | Li/Na | 36/64 | $N_2$ | 350 | 30–40M | 46.0 |
| 9 | A | Ca | 100 | $N_2$ | 350 | 30–40M | 18.4 |
| 10 | A | Na | 100 | $O_2$ | 350 | 32.5M | 33.6 |
| 11 | A | K/Na | 40/60 | $O_2$ | 250 | 45M | 86.4 |
| 12 | A | K/Na | 83/17 | $O_2$ | 400 | 36M | 109.6 |
| 13 | A | K/Na | 92/8 | $O_2$ | 250 | 45M | 42.0 |
| 14 | A | K/Na | 40/60 | $Cl_2$ | 200 | 22M | 55.6 |
| 15 | A | Li/K/Na | 45/49/6 | $CH_4$ | 350 | 28M | 83.9 |
| 16 | A | Ag/K | 40/60 | Ar | 350 | 40M | 118.0 |
| 17 | A | K/Na | 83/17 | Ne | 350 | 30M | 65.4 |
| 18 | A | K/Na | 83/17 | $CO_2$ | 350 | 40M | 65.2 |
| 19 | A | K/Na | 92/8 | $H_2$ | 350 | 30M | 31.1 |
| 20 | X | Na | 100 | Ar | 250–350 | 10–40M | 26.8 |
| 21 | X | Na | 100 | $O_2$ | 250–350 | 10–40M | 18.9 |
| 22 | K–G | Ca | 100 | $Cl_2$ | 220 | 22M | 26.1 |
| 23 | K–G | Ca/K | 45/55 | Ar | 250–350 | 10–40 | 12.9 |
| 24 | K–G | Ca/K | 45/55 | Ne | 250–350 | 10–40 | 14.4 |
| 25 | K–G | Na/K | 45/55 | $H_2$ | 250–350 | 10–40 | 14.6 |
| 26 | K–G | Na/K | 61/39 | Ar | 250–350 | 10–40 | 24.7 |
| 27 | K–G | Na/K | 61/39 | Ne | 250–350 | 10–40 | 13.3 |
| 28 | K–G | K | 100 | Ar | 250–350 | 10–40 | 25.8 |
| 29 | K–G | K | 100 | $Cl_2$ | 250–350 | 10–40 | 49.9 |
| 30 | K–G | K | 100 | Ne | 250–350 | 10–40 | 18.9 |
| 31 | K–G | K | 100 | $H_2$ | 250–350 | 10–40 | 15.6 |
| 32 | K–G | K | 100 | He | 250–350 | 10–40 | 13.5 |
| 33 | J | K | 100 | Ar | 250–350 | 10–40 | 7.9 |
| 34 | J | K | 100 | Ne | 250–350 | 10–40 | 17.7 |
| 35 | J | K | 100 | $O_2$ | 250–350 | 10–40 | 16.1 |
| 36 | F | K | 100 | Ar | 250–350 | 10–40 | 13.5 |
| 37 | F | K | 100 | Ne | 250–350 | 10–40 | 13.3 |

Table II readily illustrates the wide variety of zeolitic molecular cage-gas combinations which can be used to form various gas encapsulation products.

Table II, at item Nos. 20 and 21, illustrates another aspect of the present invention. Zeolite X has a pore-cavity system which is characterized by extremely large pores, in fact, the effective pore size in this large pore-cavity system at approximately room temperature is several times larger than the effective diameter of either argon or oxygen at room temperature therefore if only the large pore-cavity system of Zeolite X is considered, one would not conclude that either argon or helium could be encapsulated; yet as shown in item Nos. 20 and 21, Zeolite X encapsulated significantly large amounts of argon and oxygen. This is readily explained when a second small pore-cavity system in Zeolite X is considered. This ployed. The optimum temperature required to obtain the highest storage capacity for the system referred to in FIGURE 6 ranges from about 230 to about 330° C.

Figure 7:
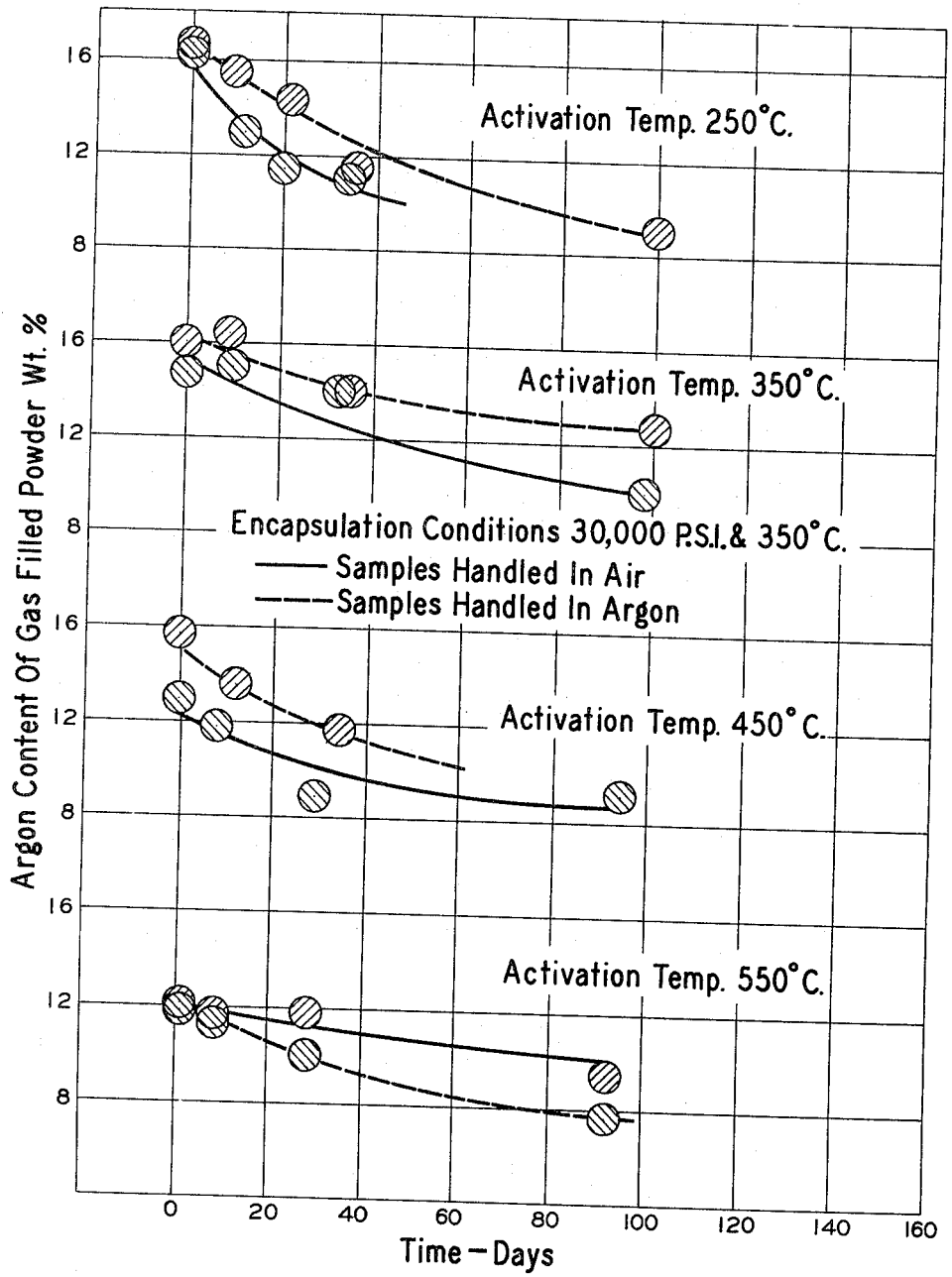

FIGURE 7 graphically illustrates storage stability as a function of temperature of activation for argon in dehydrated type A zeolite which contained substantially only potassium as the cationic constituent. A comparison of FIGURES 6 and 7 show that in the illustrated system, although lower activation temperatures e.g. 250 to 350° C. favor high initial storage capacity, high activation temperatures e.g. 450 to 550° C. enable an artisan to realize greater storage stability. An activation temperature ranging from about 350° C. to 450° C. appears to be a reasonable compromise between storage capacity and storage stability for this particular illustrated potassium A zeolitic molecular cage-argon system.

Effect of encapsulation temperature on storage capacity and storage stability As previously discussed, encapsulation temperature is that temperature at which fluid molecules possess sufficient energy, both translational and vibrational, to surmount the potential energy barrier posed by the pore opening in the molecular cage. It has been found that there is no sharp break in the amount of fluid encapsulated as a function of increasing encapsulation temperatures but rather there is an asymptotic increase in storage capacity with increasing encapsulation temperatures which apparently reaches a limit somewhere below the temperature at which the crystal structure of the molecular sieve is destroyed. This affect may be due to the fact that as the temperature increases an increasing number of molecules acquire sufficient energy to pass through the pores and into the cavity of the cage.

Figure 8:
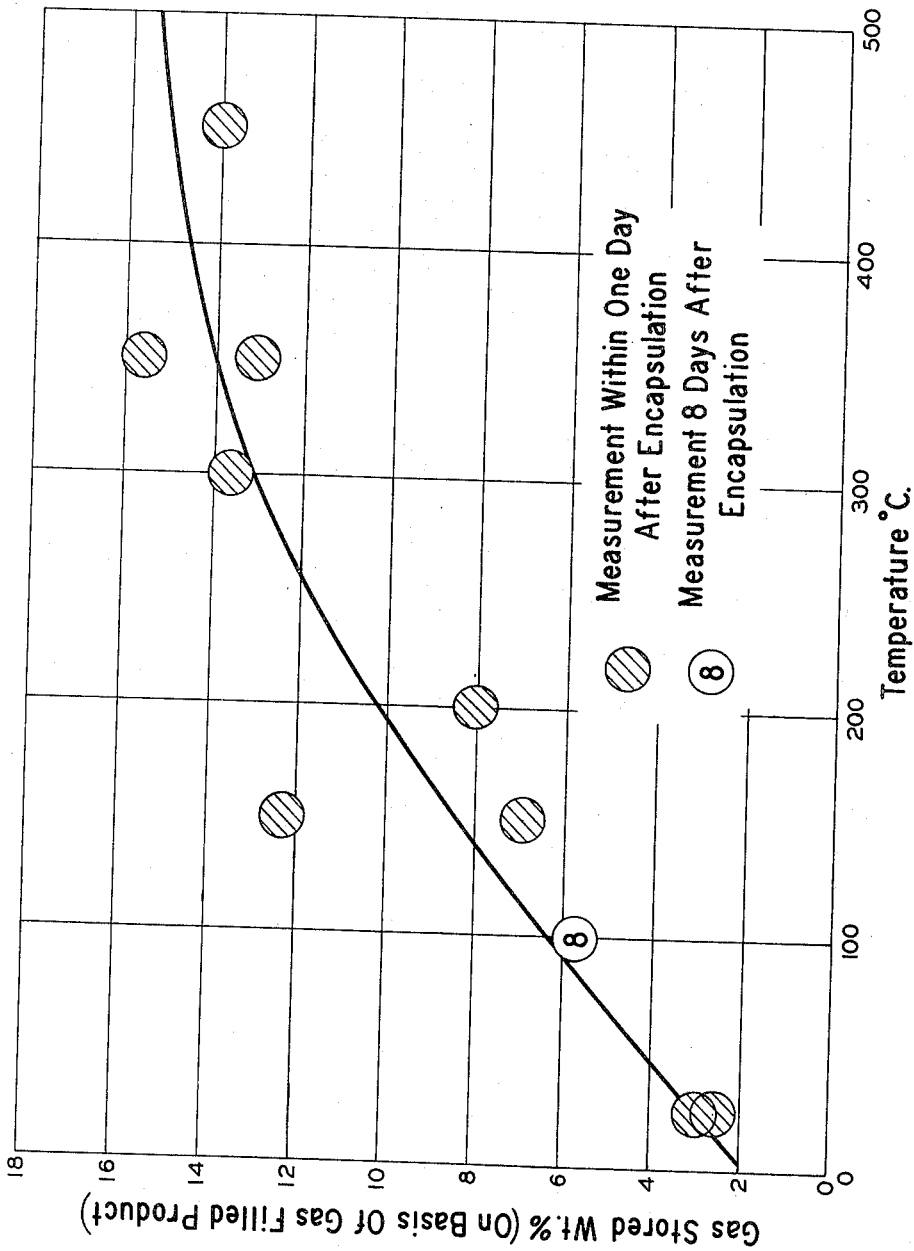

FIGURES 8 and 9 illustrate the extent of increase of storage capacity as the encapsulation temperature is increased in an argon-potassium A zeolitic molecular cage encapsulate. FIGURE 8 shows data obtained with increasing encapsulation temperature at an encapsulation pressure of 40,000 p.s.i. and FIGURE 9 shows data obtained with increasing temperature at an encapsulation pressure of 20,000 p.s.i. The data were obtained at various times ranging from 1 day to 8 days after encapsulation as noted in the figures.

The data in these graphs show that the fluid storage capacity increases fairly rapidly as temperature increases up to about 400° C. at constant encapsulation pressures and then continues to increase at a less rapid rate as temperatures above 500° C. are approached for the same encapsulation pressure. Although storage capacity is very high at temperatures as low as 150° C. it has been found that storage stability of the encapsulates produced at about 150° C. and lower is somewhat reduced while encapsulates produced at temperatures above 250° C. show excellent storage stability. Accordingly it is preferred to conduct encapsulation at temperatures above 250° C. preferably above about 300° C. and up to about 400° C. The noticeable increase in storage capacity due to the increase in encapsulation pressure between FIGURES 8 and 9 is more fully discussed below in relation to FIGURE 10.

Effect of encapsulation pressure on storage capacity and storage stability

If the encapsulation temperature is maintained, any increase in pressure on the fluid-molecular cage system will cause a corresponding increase in the concentration of fluid molecules which enter the molecular cage at encapsulation temperature. That is, at temperatures below the encapsulation temperature when only negligible numbers of fluid molecules possess sufficient energy to surmount the energy barrier posed by the pore opening, no amount of pressure increase on the system will result in any substantial increase in concentration of gas molecules within the molecular cage. As the encapsulation temperature is increased and vast numbers of fluid molecules acquire sufficient energy to enter the molecular cage an increase in pressure on the system causes a significant increase in the number of fluid molecules which pass into the molecular cage.

The data used in preparation of the graph in FIGURE 10 was secured by encapsulating argon in a dehydrated potassium A zeolite at a constant encapsulation temperature of 350° C. The zeolites used in preparation of the zeolitic molecular cages had been activated in a stream of argon heated at 390° C. and 350° C., as noted in the graph. The graph shows substantial increases in the storage capacity of the subject cages for argon when encapsulation pressures above about 10,000 p.s.i. are employed.

Encapsulation pressures in general above about 5,000 p.s.i at encapsulation temperatures ranging in general from about 200° C. to about 400° C. have been found to give high storage capacity. Pressures above 20,000 p.s.i. give even higher storage capacity.

The following examples illustrate various aspects of the present invention.

Examples I and II respectively illustrate the storage of $N_2$ and argon in dehydrated Potassium A zeolites. Example II also illustrates stability of the encapsulates under standard temperature and pressure, a method of decapsulation or release of the encapsulated gas and various other aspects of the present invention.

EXAMPLE I

An open end Pyrex test tube containing a 27.8 g. sample of pelletized and activated Potassium A zeolite was placed in a 240 cc. pressure vessel. The vessel was closed and heated at a temperature of 250° C. It was then purged twice with $N_2$ at 4000 p.s.i after which it was heated at 250° C. under $N_2$ at atmospheric pressure for an additional hour. The nitrogen pressure was then raised to 30,000 p.s.i while maintaining a temperature of 250° C. and the vessel was sealed off and allowed to cool to room temperature. When the vessel had cooled to room temperature, the residual gas was removed and the pellets were removed and weighed. They had gained 60.8 cc. of $N_2$ per gram of activated Potassium A zeolite. When the nitrogen-treated pellets were dropped into water, they gave off gas bubbles. When the original untreated Potassium A zeolite pellets were dropped into water, they sank immediately and did not release any gas.

Example II

A portion each of Potasium A zeolite powder and of Potassium A zeolite pellets were each placed in one-inch open end Pyrex tubes and activated by heating to 390° C. in a stream of dry argon to activate the zeolites. The activated materials were then placed in test tubes which were inserted in a 240 cc. pressure vesel. The vessel was heated to 350° C. for three hours and argon was pumped in until the pressure reached 33,000 p.s.i. The vessel was then sealed off and allowed to cool. When the system had cooled to room temperature, the non-encapsulated, excess gas was released and the samples were removed and weighed. The pelletized sample (i.e. pelletized encapsulate) had gained 0.84 g. of argon (7.7 wt. percent) and the powder sample (i.e. powder encapsulate) had gained 0.87 g. of argon (11.3 wt. percent). Two 0.5 g. samples of the powder were destroyed in concentrated HCl; 39.0 cc. of gas were evolved from the pelletized sample and 63.4 cc. were evolved from the powder sample.

To demonstrate that the storage of argon recorded in the experiment above was stable at room temperature and low pressures, a sample of the argon containing pelletized material was placed in a small test tube in a vacuum system and evacuated at room temperature for two hours. The original gross weight of the sample plus the test tube was 5.93 grams; the weight after this treatment was 5.93 grams. A half-gram sample of the vacuum-treated powder was destroyed in concentrated HCl and 35.9 cc. of gas were evolved.

To show that the argon encapsulated in Potassium A cages can be released at a high temperature, two samples i.e. Nos. 1 and 2 of the pelletized encapsulate produced in Example II above were placed in test tubes and heated to 350° C. in argon at atmospheric pressure. The gross weights of the tubes plus the samples before this treatment were 5.37 grams of Sample No. 1 and 6.30 grams for Sample No. 2; after this treatment, the gross weights were 5.28 and 6.21 grams respectively for Samples Nos. 1 and 2. Small samples of the powder encapsulate from each tube were destroyed in HCl and they gave off 11.1 and 10.2 cc. of gas per 0.5 gram of encapsulate for each of Samples Nos. 1 and 2 respectively. The pelletized encapsulate product before heat treatment contained three times this amount of gas as shown above.

Examples I and II adequately indicate the technique utilized to encapsulate any one of the various gases in the various molecular cages noted in Table I and in addition the examples illustrate various means for decapsulation of gas from the encapsulates.

To show that the encapsulation of gas, as described above, does not cause any substantial change in the crystal structure of the encapsulating agent three different samples were examined; i.e. a sample of the activated Potassium A zeolite powder used originally in Example II in its natural unloaded condition prior to encapsulation and, a sample of the same powder after encapsulation of argon, along with a sample of the powder after decapsulation were examined by X-ray techniques. All of these materials had substantially the same X-ray pattern. There were very slight variations in the size of the crystal lattice; the $d$ values, calculated from peaks which occurred near angles $2\theta = 69°$ with the $C_uK_o$ radiation used are listed below:

| Sample | $d$ Value | Remarks |
| --- | --- | --- |
| Powder prior to encapsulation | 1.360 | Original powder. |
| Powder Encapsulate | 1.364 | Powder encapsulate. |
| Powder after decapsulation | 1.360 | Decapsulated powder. |

To establish the fact the increase in weight and the gas content of zeolite samples treated with argon at high temperature and pressure is due to encapsulated argon, the following is presented. A sample of Potassium A zeolite powder was activated at 390° C. and 7.07 grams of the activated zeolite resulting therefrom were placed in a Pyrex test tube in a 240 cc. pressure vessel. The vessel was closed and purged twice with 2,000 p.s.i. of argon and then heated to 350° C. After 17½ hours at this temperature, argon was pumped into the vessel until the pressure reached 31,000 p.s.i. After 2 hours at 350° C., the pressure had fallen to 26,000 p.s.i. and additional argon was pumped until a pressure of 33,000 p.s.i. was attained. Two and a half hours later the pressure had fallen to 27,000 p.s.i. and argon was again pumped in until a pressure of 33,000 p.s.i. was attained. After two more hours, the pressure was down to 29,000 p.s.i. and argon was again added to the vessel until the pressure reached 34,000 p.s.i. During all the repressurizations the temperature was maintained at 350° C. The heat was turned off and the vessel was allowed to cool to room temperature. The residual pressure after cooling to room temperature was 12,000 p.s.i. The pressure was released and the sample was removed and weighed. It had gained 0.90 g. (12.7 wt. percent). Subsequent analysis by destruction of part of the sample in concentrated HCl showed that it contained 83.4 cc. of argon gas per gram of encapsulate (13.8 wt. percent). A sample of the encapsulate was placed in a test tube and connected through a gas sample bulb to a vacuum system. The entire system was evacuated for 1½ hours to less than 1 mm. Hg. The vacuum pump was disconnected from the sample bulb and the sample was heated to 350° C. In about three minutes, the pressure in the sample bulb was equal to one atmosphere. The gas sample obtained was analyzed in a mass spectrometer and found to contain about 97.4 mole percent of argon.

High pressure at room temperature will not result in significant gas storage in zeolites. The results of the experiment to be described show that simultaneous application of high pressure and high temperature is necessary to encapsulate significant quantities of gas.

Samples of Potassium A zeolite and Sodium A zeolite were activated at 390° C. in a stream of dry argon. A 6.57 g. sample, i.e. Sample No. 1 of the activated Potassium A zeolite and 3.93 g. of the activated Sodium A zeolite i.e. Sample No. 2 were placed in separate Pyrex test tubes in a 240 cc. pressure vessel. At room temperature, argon was pumped into the vessel until a pressure of 40,000 p.s.i. was maintained in the vessel. Later the same day the pressure was released and the samples were removed and weighed. The Potassium A Sample No. 1 had gained 0.04 g. (0.6 wt. percent) and the Sodium A Sample No. 2 had gained 0.06 g. (1.5 wt. percent). The amount of gas contained in these samples is in sharp contrast to the encapsulates shown in FIGURE 6 wherein Potassium A encapsulates showed a weight gain ranging from about 7 weight percent for encapsulation temperatures of about 150° C. to about 17 weight percent when encapsulation temperatures of about 250° C. are employed. By the same token submission of a gas-zeolitic molecular cage system to elevated temperatures alone will not effect encapsulation because the quantity of the gas that will enter the sieve will be insignificant.

The following Example III illustrates several methods for release of the encapsulated gas i.e. decapsulation.

EXAMPLE III

A sample of activated Potassium A zeolite was treated with nitrogen at 40,000 p.s.i. and 350° C. The material, resulting therefrom and weighed immediately after the run, showed a gain of 7.7 wt. percent, e.g. encapsulation of about 31 cc. of nitrogen. Twenty days later a 0.50 gram sample of the product of this run was treated with concentrated HCl and 30.5 cc. of gas was evolved corresponding to a 7.6 wt. percent gas content. On the same day, a second 0.50 gram sample was treated with water instead of concentrated HCl. Most of the trapped or encapsulated gas was released within a relatively short time. The results for water decapsulation are tabulated below:

| Time, min. | Gas evolved (room temp.), cc. |
| --- | --- |
| 20 | 23.1 |
| 60 | 26.4 |
| 83 | 28.0 |

In the case of some of the products prepared, the methods described above are not suitable because the gas stored may react with water, the mineral acid or other chemicals used to destroy the cage. In these cases, decapsulation may be accomplished thermally by heating above the decapsulation temperature while maintaining the pressure at a low level; preferably atmospheric if complete decapsulation is required or desired. The effect of temperature on decapsulation is adequately shown in FIGURE I.

Various uses can be made of the present invention. A few uses are discussed below under appropriate headings.

*Separation of gases by encapsulation*

It is difficult and cumbersome to separate some gas species. For example separation of neon from helium using activated charcoal is cumbersome. The present encapsulation process is amenable for use in accomplishing the separation of neon from at least helium.

Neon has an effective molecular size of approximately 2.75 A. at 300° K. whereas helium has an effective molecular size of approximately 2.6 A. at the same temperature. It has been found that the encapsulation process of the present invention exhibits sufficient selectively toward gas molecules of slightly different apparent molecular size to enable an artisan to conduct separations of such gas species.

By way of illustration, the following Table III illustrates the separation of neon from helium utilizing dehydrated Potassium type A zeolite having a $K/Na$ ratio equal to 83/17. The encapsulation separation process was conducted at a temperature of about 350° C. and a pressure of about 22,000 p.s.i. The analysis of the crude gas and the gases recovered from the zeolite encapsulate were determined by spectrographic technique and are shown in the following Table III.

TABLE III

| | Crude Gas (mol percent) | Withdrawn Gas (mol percent) |
|---|---|---|
| He | 18.8 | 6.9 |
| Ne | 74.0 | 89.8 |
| CO+$N_2$ | 3.1 | 0.12 |
| $O_2$ | 0.28 | (¹) |

¹ Not detected.

From the above data it is readily apparent that encapsulation separations of gas species can readily be conducted on fluid species differing by as little as .16 A. in apparent molecular size.

In addition, more complete separation could readily be accomplished by cyclic encapsulation treatment of the fluid species mixtures and/or cyclic encapsulation treatment of the gas mixtures with zeolitic molecular cages having alternatively differing excited pore sizes.

Use of encapsulated chlorine as a bleaching agent

Approximately 200 grams of Type A zeolite having a K/Na ratio of 40/60 was activated at 350° C. in a 2-inch tube furnace. About 2.5 grams of the activated zeolite powder was placed in a glass tube in a 50-cc. pressure vessel. The vessel was connected to a chlorine cylinder and chlorine was admitted into the vessel. The vessel was closed and heated at 200° C. for 3 hours. The pressure at this temperature was 22,000 p.s.i. The vessel was allowed to cool to room temperature and it was opened one day later. Samples of the thus produced chlorine-containing encapsulate were analyzed by heating them to evolve the trapped chlorine. The encapsulate samples contained 17.6 wt.-percent of chlorine.

About three months after the chlorine encapsulate was prepared, it was tested as a bleaching agent. A sample of the encapsulate was placed on a moistened sheet of yellow paper and in about 3 minutes the color was bleached out. A few grains of the encapsulate powder were sprinkled on a drop of ink in a watch glass and in 20 seconds the color disappeared.

From the foregoing disclosure it is readily apparent that encapsulation is a novel phenomenon for achieving occlusion of fluids in solid substances e.g. three dimensional, crystalline alumino-silicate zeolitic molecular cages. This method of gas occlusion is readily distinguished from known adsorption and clathration techniques. Although preferred embodiments of the present invention have been described in detail, it is contemplated that modifications of the method and composition of matter disclosed herein may be made and that some features may be employed without others; all within the spirit and scope of the invention.

We claim:

1. A fluid encapsulate comprising a substantially dehydrated three dimensional crystalline zeolite A in which from about 60 to about 83 percent of the cation content is potassium and the remaining cation content is provided by sodium, said zeolite A having confined in the inner cavities thereof at least one gas selected from the group consisting of argon, krypton and methane, said gas being held within the cavities of the zeolite in a state wherein they do not possess sufficient energy to overcome the potential energy barrier posed by the pore openings of the zeolite.

2. A fluid encapsulate according to claim 1 in which the potassum cation content of the encapsulating zeolite A is at least about 80 percent of the total cation content.

References Cited by the Examiner

UNITED STATES PATENTS

| | | | |
|---|---|---|---|
| 2,859,257 | 11/1958 | Hess et al. | 55—75 X |
| 2,882,243 | 4/1959 | Milton | 55—75 |
| 2,882,244 | 4/1959 | Milton | 55—75 |
| 2,950,952 | 8/1960 | Breck et al. | 23—112 |
| 2,962,355 | 11/1960 | Breck et al. | 55—389 |
| 2,972,516 | 2/1961 | Barrer et al. | 55—389 |
| 2,987,471 | 6/1961 | Eggerston | 55—75 X |
| 2,991,151 | 7/1961 | Breck et al. | 55—75 |
| 2,995,423 | 8/1961 | Breck et al. | 23—113 |
| 2,996,358 | 8/1961 | Milton | 23—113 |
| 3,008,803 | 11/1961 | Milton | 23—113 |
| 3,010,789 | 11/1961 | Milton | 23—113 |
| 3,011,869 | 12/1961 | Breck et al. | 23—113 |
| 3,012,853 | 12/1961 | Milton | 252—453 |
| 3,024,868 | 3/1962 | Milton | 55—75 X |
| 3,029,575 | 4/1962 | Eng et al. | 55—75 X |
| 3,030,181 | 4/1962 | Milton | 23—113 |
| 3,033,642 | 5/1962 | Bukata et al. | 23—112 |
| 3,054,657 | 9/1962 | Breck et al. | 23—113 |
| 3,056,654 | 10/1962 | Barrer et al. | 23—113 |
| 3,078,638 | 2/1963 | Milton | 55—75 |
| 3,078,643 | 2/1963 | Milton | 55—75 |
| 3,130,007 | 4/1964 | Breck | 252—455 |

OTHER REFERENCES

Hersh, C. K., Molecular Sieves, N.Y., Reinhold Pub. Co., Aug. 11, 1961.

"Molecular Sieves," by D. W. Breck et al., Scientific American, January 1959, pp. 85–96.

Greismer et al. "Latest Advances in Adsorption," in Petroleum Refiner 39 (6) pp. 125–132, June 1960.

REUBEN FRIEDMAN, *Primary Examiner.*

GEORGE D. MITCHELL, J. DE CESARE, B. NOZICK, *Assistant Examiners.*